Patented Aug. 5, 1952

2,606,195

UNITED STATES PATENT OFFICE 2,606,195

ARYL PYRIDYL CARBINOL ETHERS

Charles H. Tilford, Silverton, and Robert S. Shelton, Mariemont, Ohio, assignors to The Wm. S. Merrell Company, Cincinnati, Ohio, a corporation of Delaware No Drawing. Application November 19, 1947, Serial No. 787,024

3 Claims. (Cl. 260—296)

This invention relates to chemical compounds which are useful for combatting, reducing or minimizing the physiological effects of histamine and other allergens, e. g., for the relief of hayfever, asthma of allergenic origin, urticaria and the like.

The new compounds of the invention are 2-picoline derivatives having the generic formula

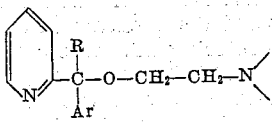

in which R is a hydrogen atom or a methyl group, Ar is a methoxyphenyl, chlorophenyl, bromophenyl or tolyl radical, and in which the two unoccupied valences of the nitrogen atom are occupied by alkyl radicals having from one to three carbon atoms, by the tetramethylene radical, by the pentamethylene radical, or by the 3-oxapentamethylene radical $$(-CH_2-CH_2-O-CH_2-CH_2-).$$

The new compounds are basic, and are ordinarily used in the form of an acid addition salt, i. e., as the hydrochloride, hydrobromide, sulfate, phosphate, glycolate, acetate, maleate, succinate, tartrate, levulinate, or the like, by oral administration in the form of tablets or other suitable form. The hydrochlorides and hydrobromides are white, crystalline materials. The free bases are distillable under vacuum and may be converted to the salts by simple neutralization with the required amount of acid, while the acid addition salts may be converted to the free base by treatment with caustic or carbonated alkali in the usual way.

The new compounds are conveniently prepared by heating the appropriate substituted-phenyl-(2-pyridyl)-carbinol with the appropriate aminoalkyl chloride or other salt in the presence of sodium, with purification of the free base product by distillation, or crystallization, or by conversion to a salt followed by crystallization. The preparation of certain of the compounds falling within the present invention is illustrated by the following examples, but the invention is not limited thereto.

Example I

The intermediate (2-methoxyphenyl)-(2-pyridyl)-carbinol having the structural formula

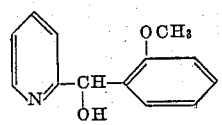

was prepared by the reaction of 2-methoxybenzaldehyde with pyridine and aluminum. A mixture of 22 gms. (0.8 mole) of aluminum (30-mesh), 1 gm. of mercuric chloride and five drops of mercury was stirred in a flask at about 125° C. for a few minutes. To this mixture there was then added 50 ml. of pyridine and 50 gms. (0.37 mole) of the aldehyde. A vigorous reaction ensued when a crystal of iodine was added to the reaction mixture as a catalyst. 450 ml. of pyridine was then poured into the reaction mixture, which was thereafter heated to reflux with stirring. This was followed by the addition of 150 gms. (1.1 moles) of the aldehyde over a period of about one hour. The mixture was next refluxed for from six to twelve hours, most of the unchanged pyridine was removed by vacuum distillation, and the residue was then taken up in 300 ml. of toluene. To this with stirring was added 135 gms. of potassium hydroxide and 500 ml. of water. The aqueous layer was discarded, and the toluene solution extracted with an excess of 10% hydrochloric acid. The combined acid extracts was then made alkaline with 20% aqueous potassium hydroxide, after which the precipitated oil was extracted with toluene and distilled. 32 gms. of the desired intermediate was collected within the boiling range 144–148° C. at an absolute pressure of 0.3 mm. of mercury. The carbinol was identified by its hydrochloride salt which melted at 170–172° C. and analyzed 14.15% by weight of chlorine (calculated, 14.10%).

In the preparation of the aminoether, 29 gms. (0.134 mole) of the aforementioned carbinol was dissolved in 240 ml. of toluene, and any water present was removed by distilling until about 50 ml. of distillate was collected. To the hot solution 3.1 gms. (0.134 mole) of sodium was added with vigorous stirring, and the mixture was refluxed until nearly all of the sodium had reacted. Then 19 gms. (0.175 mole) of beta-dimethylaminoethyl chloride in 200 ml. of toluene was added over a period of an hour, followed by an addition of 0.9 gm. (0.04 mole) of sodium. The refluxing was continued for from twelve to sixteen hours, after which the toluene solution was washed with water and treated with 10% hydrochloric acid until it was acid to Congo red. Sufficient sodium bicarbonate was then added to make the solution alkaline to Congo red. This operation resulted in the unchanged carbinol remaining in the toluene layer, and the aminoether being extracted into the aqueous layer. The aqueous extract was then made alkaline with sodium carbonate, extracted with about 200 ml. of petroleum ether, and the petroleum ether extract fractionally distilled. The aminoether product alpha-(2-methoxyphenyl)-alpha-(2¹-dimethyl aminoethoxy)-2-picoline having the structural formula

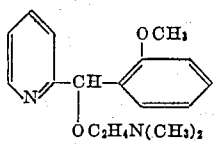

was collected at 152–154° C. at an absolute pressure of 0.2 mm. of mercury, and amounted to 12 gms. The monohydrochloride was prepared by dissolving the aminoether in about 50 ml. of ethanol and adding 3.5 ml. of 43% alcoholic hydrochloric acid. About three volumes of dry ether was then added, and the percipitate that formed was recrystallized from butanone. The hygroscopic crystals melted at 133–135° C. and analyzed 10.90% by weight of chlorine (calculated 10.85%).

Example II

The intermediate (4-methoxypenyl)-(2-pyridyl)-methylcarbinol having the structural formula

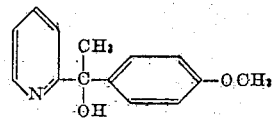

was prepared in a manner similar to that employed in preparing the intermediate of Example I, in this instance using 480 gms. (3.2 moles) of 4-methoxyacetophenone, 340 gms. of pyridine, and 34 gms. (1.27 moles) of granular aluminum. The intermediate had a boiling range of 165–168° C. at an absolute pressure of 0.4 mm. of mercury and amounted to 180 gms. The hydrochloride salt of the intermediate melted at 171–172° C. and analyzed 13.25% by weight of chlorine (calculated, 13.38%).

The compound alpha-(4-methoxyphenyl)-alpha-methyl-alpha-(2¹-dimethylaminoethoxy)-2-picoline having the structural formula

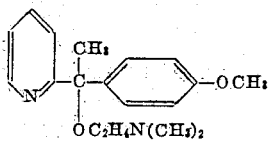

was obtained by a procedure similar to that of Example I, using 34 gms. (0.15 mole) of the intermediate together with an appropriate amount of beta-dimethylaminoethyl chloride. The product distilled within the range 173–175° C. at an absolute pressure of 0.2 mm. of mercury and weighed 20 gms. The monohydrochloride of the product melted at 152–153° C. and analyzed 10.45% by weight of chlorine (calculated, 10.55%).

Example III

The intermediate (3-methoxyphenyl)-2-pyridyl)-methylcarbinol was prepared in the manner similar to that employed in Example I, using 360 gms. (2.4 moles) of 3-methoxyacetophenone. The intermediate distilled within the range 145–152° C. at an absolute pressure of 0.4 mm. of mercury and weighed 75 gms. The hydrochloride of the intermediate melted at 166–168° C. and analyzed 13.0% by weight of chlorine (calculated, 13.0%).

From 59 gms. (0.25 mole) of the intermediate and an appropriate amount of beta-dimethylaminoethyl chloride by the previously described etherification procedure was obtained 31.6 gms. of alpha-(3-methoxyphenyl)-alpha-methyl-alpha-(2¹-dimethylaminoethoxy)-2-picoline which distilled at 167–173° C. at an absolute pressure of 0.2 mm. of mercury. The monohydrochloride of that compound melted at 130–132° C. and analyzed 10.45% by weight of chlorine (calculated, 10.55%).

Example IV

The intermediate (2-chlorophenyl)-(2-pyridyl)-carbinol was prepared by the reaction of 2-chlorobenzaldehyde with pyridine and magnesium. A mixture of 24 gms. (1 mole) of magnesium turnings, 5 gms. of mercuric chloride and five drops of mercury was stirred in a flask at about 125° C. for a few minutes. Then 300 ml. of pyridine and a crystal of iodine were added, and the mixture was refluxed during an hour's addition of 260 gms. (1.9 moles) of 2-chlorobenzaldehyde. The mixture was then stirred under reflux for about six hours. Most of the unreacted pyridine was thereafter removed by vacuum distillation, and the residue was taken up in 300 ml. of toluene. To this with stirring was added 107 ml. of water. The emulsion thus formed was filtered through celite, and the toluene layer was separated and extracted with an excess of 10% hydrochloric acid. The aqueous extract was then made alkaline, the precipitated oil extracted with toluene, and the toluene extract fractionally distilled. At 145–148° C. and an absolute pressure of 0.2 mm. of mercury there was collected 51 gms. of the desired carbinol, the hydrochloride of which melted at 175–176° C. and analyzed 13.95% by weight of chlorine (calculated, 13.83%).

In the preparation of the desired compound alpha-(2-chlorophenyl)-alpha-(2¹-dimethylaminoethoxy)-2-picoline, 40 gms. (0.18 mole) of the carbinol intermediate was dissolved in 330 ml. of toluene. A small amount of water was removed by distilling the solution until about 50 ml. of distillate had been collected. To the hot solution was added 4.1 gms. (0.18 mole) of sodium with vigorous stirring, and the mixture was refluxed until the sodium had practically all reacted. Then 27 gms. (0.23 mole) of dimethylaminoethyl chloride in 250 ml. of dry toluene was added over a period of an hour, followed by the addition of 1.1 gm. (0.05 mole) of sodium with the refluxing being continued for twelve to sixteen hours. The reaction mixture was washed with water and treated with 10% hydrochloric acid until it was acid to Congo red. Sufficient saturated sodium bicarbonate solution was then added to make the mixture alkaline to Congo red. This operation resulted in the unchanged carbinol remaining in the toluene layer, while the product was extracted into the aqueous layer. The aqueous extract was made alkaline with sodium carbonate, extracted with 300 ml. of petroleum ether, and this ether extract was fractionally distilled. The product was collected at 174–176° C. at an absolute pressure of 0.2 mm. of mercury and amounted to 22 gms. The monohydrochloride was prepared by dissolving the product in about 50 ml. of ethanol and adding to this solution 6.3 ml. of 43% alcoholic hydrochloric acid. About three volumes of dry ether was added, and the precipitate that formed was recrystallized from an isopropanol-ethyl acetate mixture. The slightly hygroscopic crystals melted at 116–118° C. and analyzed 10.90% by weight of chlorine (calculated, 10.85%).

Example V

The intermediate (3-chlorophenyl)-(2-pyridyl)-methylcarbinol was prepared following the procedure of Example IV and using 267 gms. (1.75 moles) of 3-chloroacetophenone. The intermediate distilled at 145–148° C. at an absolute pressure of 0.3 mm. of mercury and weighed 68 gms. The hydrochloride of the intermediate melted with decomposition at 155–157° C. and analyzed 13.05% by weight of chlorine (calculated, 13.12%).

The product alpha-(3-chlorophenyl)-alpha-methyl-alpha-($2^1$-dimethylaminoethoxy)-2-picoline was prepared by an etherification procedure similar to that of Example IV using 35 gms. (0.15 mole) of the intermediate and an appropriate amount of beta-dimethylaminoethyl chloride. The product was collected at 158–162° C. at an absolute pressure of 0.1 mm. of mercury, and weighed 18 gms. The monohydrochloride had a melting point of 137–138° C. and analyzed 10.45% by weight of chlorine (calculated, 10.40%).

Example VI

The intermediate (4-chlorophenyl)-(2-pyridyl)-methylcarbinol was obtained following the procedure of Example IV, this time using 170 gms. (1.1 moles) of 4-chloroacetophenone, 400 ml. of pyridine and 22 gms. (0.82 mole) of 30-mesh granular aluminum. The intermediate distilled at 145–148° C. at an absolute pressure of 1 mm. of mercury and amounted to 28 gms. The hydrochloride of the intermediate melted at 202–204° C. and analyzed 13.15% by weight of chlorine (calculated, 13.12%).

The compound alpha-(4-chlorophenyl)-alpha-methyl-alpha-($2^1$-dimethylaminoethoxy)-2-picoline was prepared by the etherification procedure of Example IV using 21 gms. (0.1 mole) of the intermediate and an appropriate amount of beta-dimethylaminoethyl chloride. The product distilled at 154–156° C. at an absolute pressure of 0.2 mm. of mercury and amounted to 14 gms. The monohydrochloride of the product melted at 162–164° C. and analyzed 10.35% by weight of chlorine (calculated, 10.40%).

Example VII

The intermediate (3-bromophenyl)-(2-pyridyl)-methyl carbinol was prepared by the procedure of Example VI, using 263 gms. (1.32 moles) of 3-bromoacetophenone. The intermediate distilled at 165–172° C. at an absolute pressure of 0.7 mm. of mercury and weighed 60 gms. The hydrochloride of the intermediate melted at 162–165° C. and analyzed 11.30% by weight of chlorine (calculated, 11.28%).

The compound alpha-(3-bromophenyl)-alpha-methyl-alpha-($2^1$-dimethylaminoethoxy)-2-picoline was prepared from 40 gms. (0.146 mole) of the intermediate and an appropriate amount of beta-dimethylaminoethyl chloride. This product distilled at 180–185° C. at an absolute pressure of 0.2 mm. of mercury and weighed 13.5 gms. The monohydrochloride of the product melted at 126.8° C. and analyzed 9.3% by weight of chlorine (calculated, 9.2%).

Example VIII

By following the teachings of the preceding examples there was prepared the intermediate (4-methylphenyl)-(2-pyridyl)-methylcarbinol using 320 gms. (2.4 moles) of 4-methylacetophenone. This compound distilled within the range 134–138° C. at an absolute pressure of 0.3 mm. of mercury and 130 gms. of this intermediate was obtained. The hydrochloride of the intermediate melted at 166–167° C. and analyzed 14.20% by weight of chlorine (calculated, 14.25%).

The compound alpha-(4-methylphenyl)-alpha-methyl-alpha-($2^1$-dimethylaminoethoxy)-2-picoline was prepared by the etherification of the intermediate using 53 gms. (0.25 mole) thereof. The product distilled at 144–145° C. at an absolute pressure of 0.2 mm. of mercury and 30 gms. thereof was obtained. The monohydrochloride of the product melted at 178–179° C. and analyzed 11.0% by weight of chlorine (calculated, 11.05%).

Various modifications may be made in the specific procedures of the foregoing examples to result in the production of additional compounds which fall within the scope of the present invention. Thus, in preparing the carbinol intermediate there may also be employed 2-methoxyacetophenone, 4-methoxybenzaldehyde, 3-chlorobenzaldehyde, 4-bromobenzaldehyde, 2-chloroacetophenone, 2-methylbenzaldehyde, 4-methylbenzaldehyde, 2-methylacetophenone, etc., and in the etherification of the carbinol intermediate there may also be employed beta-diethylaminoethyl chloride, beta-methylethylaminoethyl chloride, beta-diisopropylaminoethyl chloride, beta-methylpropylaminoethyl chloride, 1-(beta-chloroethyl)-pyrrolidine, 1-(beta-chloroethyl)-piperidine, 1-(beta-chloroethyl)-4-oxapiperidine, etc.

We claim:

1. The compounds having the generic formula

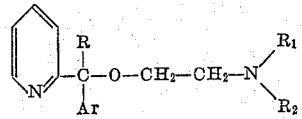

in which R is a substituent selected from the group consisting of hydrogen and the methyl radical, Ar is a substituent selected from the group consisting of the methoxyphenyl, chlorophenyl, bromophenyl and tolyl radicals, in which $R_1$ and $R_2$ are substituents selected from the group consisting of the alkyl radicals having from one to three carbon atoms, and in which $R_1$ and $R_2$, when taken together, form with the amino nitrogen atom a substituent selected from the group consisting of the pyrrolidino radical, the piperidino radical, and the morpholino radical, with the proviso that when R is hydrogen, then Ar is selected from the group consisting of chlorophenyl and bromophenyl.

2. Alpha-(4-methylphenyl)-alpha-methyl-alpha-($2^1$-dimethylaminoethoxy)-2-picoline.

3. Alpha-(3-methoxyphenyl)-alpha-methyl-alpha-($2^1$-dimethylaminoethoxy)-2-picoline.

CHARLES H. TILFORD.
ROBERT S. SHELTON.

REFERENCES CITED

The following references are of record in the file of this patent:

Jour. Chem. Soc. pages 809–812 (1939).
Chem. Abstracts 35, 4771³ (1941).
Hartman—California Medicine, 66 (No. 4) pp. 242–248 (1947).
Journal of Pharmacology, 83, pp. 120–128.
Sidgwick: Organic Chemistry of Nitrogen p. 522 (New Edition, Oxford and Clarendon Press).